(12) United States Patent
Nickel et al.

(10) Patent No.: US 8,110,647 B2
(45) Date of Patent: Feb. 7, 2012

(54) PROCESS FOR THE PREPARATION OF AN ORGANOPOLYSILOXANE FUNCTIONALIZED WITH A BENZALMALONATE BY HYDROSILYLATION IN THE PRESENCE OF A HYDROXY CARBOXYLIC ACID OR A CYCLIC ESTER THEREOF

(75) Inventors: Friedhelm Nickel, Tuebingen (DE); Peter Will, Moessingen (DE)

(73) Assignee: DSM IP Assets B.V., Heerlen (NL)

( * ) Notice: Subject to any disclaimer, the term of this patent is extended or adjusted under 35 U.S.C. 154(b) by 247 days.

(21) Appl. No.: 12/628,475

(22) Filed: Dec. 1, 2009

(65) Prior Publication Data
US 2010/0137545 A1   Jun. 3, 2010

(30) Foreign Application Priority Data
Dec. 1, 2008 (EP) ..................................... 08170367

(51) Int. Cl.
*C08G 77/12* (2006.01)
(52) U.S. Cl. ............................................. 528/31; 528/26
(58) Field of Classification Search .................... 528/31, 528/26
See application file for complete search history.

(56) References Cited

U.S. PATENT DOCUMENTS
5,415,854 A * 5/1995 Forestier et al. ............... 424/59
* cited by examiner

*Primary Examiner* — Kuo-Liang Peng
(74) *Attorney, Agent, or Firm* — Nixon & Vanderhye P.C.

(57) ABSTRACT

The present invention relates to a process for the preparation of an organopolysiloxane functionalized with a benzalmalonate by hydrosilylation, said process involving the use of a hydroxy carboxylic acid or a cyclic ester thereof.

18 Claims, No Drawings

PROCESS FOR THE PREPARATION OF AN ORGANOPOLYSILOXANE FUNCTIONALIZED WITH A BENZALMALONATE BY HYDROSILYLATION IN THE PRESENCE OF A HYDROXY CARBOXYLIC ACID OR A CYCLIC ESTER THEREOF

This application claims priority to Europe Application No. 08170367.0 filed 1 Dec. 2008, the entire contents of which is hereby incorporated by reference.

The present invention relates to a novel process for the preparation of an organopolysiloxane functionalized with a benzalmalonate by hydrosilylation, said process involving the use of a hydroxy carboxylic acid or a cyclic ester thereof.

Polymeric UV filter agents with a molecular weight of above 1000 Dalton are highly interesting to the cosmetic industry as due to the high molecular weight they exhibit a negligible systemic exposure due to a lack of transdermal penetration. However, such UV filter agents are difficult to produce as they are not susceptible to standard industrial purification processes such as distillation or crystallization.

Organopolysiloxane functionalized with a benzalmalonate are known as UV-filter agents and are prepared by hydrosilylation, i.e. the addition of Si—H bonds to an unsaturated carbon-carbon bond attached to a benzalmalonate UV-light absorbing chromophore in the presence of a hydrosilylation catalyst such as e.g. disclosed in WO92/20690, EP1142930 or EP 358584. However, the products resulting from the prior art hydrosilylation processes exhibit an unwanted yellow to brownish discoloration which is not accepted by the cosmetic industry. Even though it is possible to discolor the products by post-treatment with adsorbents such as active charcoal, these processes have many drawbacks such as the need of high amounts of solvents, prolongation of cycle times and reduced yields.

Thus, there is an ongoing need for a simple, economically attractive and environmentally benign method which allows the preparation of organopolysiloxanes functionalized with a benzalmalonate with low color values in good yields by means of a simple industrial process.

It has surprisingly been found that the drawbacks of the prior art can be overcome if the hydrosilylation is carried out in the presence of a hydroxy carboxylic acid or a cyclic ester thereof. In particular, the products obtained via the inventive process exhibit very low color values compared to the ones prepared in the absence of the hydroxy carboxylic acid or a cyclic ester thereof.

Thus, the invention relates to a process for the manufacture of an organopolysiloxane functionalized with a benzalmalonate by hydrosilylation characterized in that said hydrosilylation is carried out in the presence of a hydroxy carboxylic acid or a cyclic ester thereof.

In a particular embodiment, the invention relates to a process according to the invention comprising the steps of reacting together
(a) an organopolysiloxane comprising at least one H-siloxane unit of formula (Ia)

(Ia)

wherein
a is 0, 1 or 2

$R^1$ is a saturated or unsaturated $C_1$-$C_{30}$ hydrocarbon group or a trimethylsilyloxy group, in particular a $C_1$-$C_{10}$ alkyl group such as a methyl group and, optionally, one or several units of formula (Ib)

(Ib)

wherein
b is 0, 1, 2, 3
$R^2$ is a saturated or unsaturated $C_1$-$C_{30}$ hydrocarbon group or a trimethylsilyloxy group, in particular a $C_1$-$C_{10}$ alkyl group such as a methyl group and
(b) a benzalmalonate of formula (IIa) and/or (IIb)

(IIa)

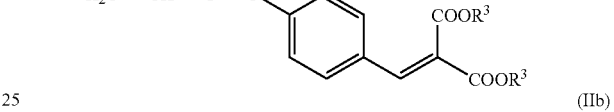
(IIb)

wherein
$R^3$ is a $C_{1-8}$-alkyl group, in particular a $C_{1-4}$-alkyl group, such as an ethyl group
Y is a divalent $C_1$-$C_{10}$ alkylene or $C_2$-$C_{10}$ alkenylene chain, in particular a $C_1$-$C_4$ alkylene chain such as a methylene group, The organopolysiloxanes are polymeric materials which may be homopolymers consisting only of units of formula (Ia), or they may be copolymers containing units of formula (Ia) as well as units of formula (Ib). The units of formula (Ia) may be distributed randomly in the organopolysiloxane, they may be the end blocking units of the polymer or they may be located at the end of the polymer and pending in a chain of the polymer at the same time.

If a is 2 the two substituents $R^1$ may be identical or different. If b is 2 or 3 the two or three substituents $R^2$ may be identical or different. If the polymer contains more than one unit of formula (Ia) the substituents $R^1$ may be identical or different from unit to unit. If the polymer contains more than one unit of formula (Ib) the substituents $R^2$ may be identical or different from unit to unit.

The organopolysiloxanes according to the invention may be linear, cyclic, branched or crosslinked. In a particular embodiment the organopolysiloxanes are linear or cyclic organopolysiloxane, characterized in that a=1 and b=2. However, if the organopolysiloxane is a substantially linear polymer at least two end blocking units must be present, thus requiring either the presence of two units in which a has a value of 2 or two units in which b has a value of 3, or a mixture thereof. Such organopolysiloxanes generally exhibit a statistical distribution of polymer chain sizes.

In a particular embodiment, the organopolysiloxane is a linear organopolysiloxane comprising one end blocking unit of formula (IIIa) and one end blocking unit of formula (IIIb) [corresponding to units of formula (Ia), wherein a=2, respectively (Ib), wherein b=3]

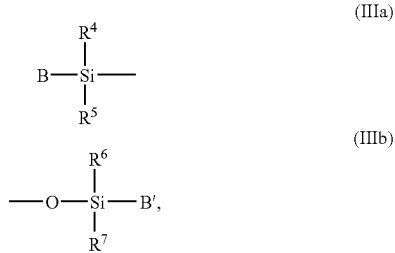

(IIIa)

s H-siloxane units of formula (IIIc) [corresponding to units of formula (Ia), wherein a=1]

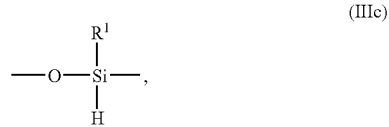

(IIIb)

and r units of formula (IIId) [corresponding to unit of formula (Ib), wherein b=2]

(IIId)

wherein
$R^1$, $R^4$, $R^5$, $R^6$, $R^7$, $R^8$ and $R^9$ independently are as defined above for $R^1$;
B and B' independently are a group H or a group $R^1$;
s is an integer from 0 to 50,
r is an integer from 0 to 200; and
with the proviso that at least B or B' is H when s is 0.

In a yet a further aspect $R^1$, $R^2$, $R^5$, $R^6$, $R^7$, $R^8$ and $R^9$ are always identical and are selected from $C_{1-4}$-alkyl groups, $R^3$ is selected from the group of $C_{1-4}$-alkyl and Y is selected from a divalent $C_1$-$C_4$alkylene chain, such as $R^1$, $R^2$, $R^4$, $R^5$, $R^6$, $R^7$, $R^8$ and $R^9$ are all methyl, $R^3$ is ethyl and Y is methylene.

In a particular embodiment, the invention relates to a process according to the invention as outlined above, comprising the steps of reacting together
(a) a linear organopolysiloxane wherein $R^1$, $R^2$, $R^4$, $R^5$, $R^6$, $R^7$, $R^8$ and $R^9$, B and B' are methyl, s is an integer from 4 to 10, preferably from 4 to 7 and r is an integer from 40 to 90, preferably from 50 to 80, further characterized in that the units of formula (IIIc) are randomly distributed in the organopolysiloxane chain and
(b) a benzalmalonate of formula (IIb) wherein Y is methylene and $R^3$ is ethyl.

In another particular embodiment, the invention relates to a process for the preparation of polysilicone-15 which is sold as PARSOL® SLX by DSM Nutritional Products Ltd. comprising the steps of reacting together
a) a linear organopolysiloxane wherein $R^5$, $R^6$, $R^7$, $R^8$ and $R^9$, B and B' are methyl, s is an integer of about 6, r is an integer of about 74 further characterized in that the units of formula (IIIc) are randomly distributed in the organopolysiloxane chain and
(b) a benzalmalonate of formula IIb wherein Y is methylene and $R^3$ is ethyl.

The addition of the H-siloxane unit (i.e. units of formula (Ia), respectively (IIIc)) to the unsaturated carbon-carbon bond of the benzalmalonate of formula (IIa) and/or (IIb) may proceed at both positions of the unsaturated carbon-carbon bond, leading to isomeric mixtures. E.g. if a H-siloxane unit is added to a triple bond mixtures of exo/endo double bond isomers of organopolysiloxane functionalized with a benzalmalonate are obtained. In a particular embodiment the ratio of units of formula (Ia) to units of formula (Ib) in the linear organopolysiloxanes functionalized with a benzalmalonate is about 4 to 1.

The term $C_1$-$C_{10}$ alkylene as used in the context of the present invention includes straight chain or branched saturated hydrocarbon residues such as methylene, 1-ethylene, 2-ethylene, 3-propylene, 2-propylene, 2-methyl-3-propylene, 3-butylene, 4-butylene, 4-pentylene, 5-pentylene, 6-hexylene, and the like.

The term $C_2$-$C_{10}$ alkenylene as used in the context of the present invention includes unsaturated hydrocarbon residues containing at least one double bond, such as for example, 2-propen-2-ylene, 2-propen-3-ylene, 3-buten-3-ylene, 3-buten-4-ylene, 4-penten-4-ylene, 4-penten-5-ylene, (3-methyl)-penta-2,4-dien-4 or 5-ylene, 11-dodecen-11-ylene, and the like. The divalent alkylene or alkenylene chains may be interrupted by one or several oxygen atoms.

The term saturated or unsaturated $C_1$-$C_{30}$hydrocarbon group as used in the context of the present invention includes $C_1$-$C_{30}$alkyl groups such as methyl, ethyl, propyl and butyl groups; $C_2$-$C_{30}$alkenyl groups such as vinyl and allyl groups; and unsubstituted or substituted aryl groups such as phenyl, alkaryl and alkoxyphenyl groups. The hydrocarbon group is unsubstituted or substituted by, e.g. halogen, e.g. a halogenated $C_1$-$C_{18}$hydrocarbon group. The alkyl and alkenyl groups may be straight chain or branched such as e.g. methyl, ethyl, 3-propyl, 2-propyl, 2-methyl-3-propyl, 3-butyl, 4-butyl, 4-pentyl, 5-pentyl, 6-hexyl, 2-propen-2-yl, 2-propen-3-yl, 3-buten-3-yl, 3-buten-4-yl, 4-penten-4-yl, 4-penten-5-yl, (3-methyl)-penta-2,4-dien-4 or 5-yl, 11-dodecen-11-yl groups.

The organopolysiloxane starting materials are well known in the silicone industry and are commercially available. They are described, for example, in the following patents: U.S. Pat. No. 3,220,972, U.S. Pat. No. 3,697,474 and U.S. Pat. No. 4,340,709 and are e.g. commercially available as Methylhydro, alkylmethylsiloxanes Copolymer (copolymer of methylhydrosiloxane and dimethylsiloxane) respectively Methylhydrosiloxanes e.g. at United Chemical Technologies (UTC, Petrarch), GE Bayer Silicones, Wacker or Dow Corning.

Preferably, the organopolysiloxane used in the processes according to the invention is a linear organopolysiloxane consisting of an average number of 56-75, in particular of about 74 units of formula (IIId) and an average number of 4-7, in particular of about 6 units of formula (IIIc), wherein $R^1$, $R^2$, $R^4$, $R^5$, $R^6$, $R^7$, $R^8$ and $R^9$, B and B' are methyl groups and which exhibits a viscosity of about 100 mPa/20° C. and a hydrogen content of about 0.09 wt.-%.

Benzalmalonates carrying an unsaturated carbon-carbon bond such as benzalmalonates of formula (IIa) and/or (IIb) and processes for their preparation are known and e.g. disclosed in WO92/20690 or EP358584. They may e.g. be prepared by reacting a hydroxy benzaldehyde with a alkinyl-, or alkenyl-halogenide such as e.g. propargyl halogenide or allyl halogenide, followed by a further reaction with a diester of malonic acid. The first reaction is preferably carried out in the presence of a suitable solvent, e.g. acetone, preferably at reflux temperatures preferably in the presence of a catalyst.

The second reaction is also preferably carried out in the presence of a solvent, e.g. toluene at reflux temperatures.

In a particular embodiment, the benzalmalonates according to formula (IIa) and/or (IIb) are selected from 2-[[4-(2-propen-1-yloxy)phenyl]methylene]-propanedioic acid 1,3-diethyl ester [CAS No 99558-38-0] and/or, 2-[[4-(2-propyn-1-yloxy)phenyl]methylene]-propanedioic acid 1,3-diethyl ester [CAS No: 146763-69-1], in particular the benzalmalonate is 2-[[4-(2-propyn-1-yloxy)phenyl]methylene]-propanedioic acid 1,3-diethyl ester.

The benzalmalonates carrying an unsaturated carbon-carbon bond such as the benzalmalonate of formula (IIa) and/or (IIb) may be used as such or they may be pre-treated with an adsorbent such as e.g. active charcoal or a bleaching earth material prior to its use in the process according to the invention. In particular suitable adsorbents are e.g. bleaching earth materials derivable from natural calcium bentonit such commercially available as Tonsil® at Sued Chemie. If the benzalmalonate is pre-treated, the adsorbent is used in the range of 1 to 15 wt %, preferably from 4 to 10 wt.-%, in particular in the range of 6 wt.-% based on the benzalmalonate. The pre-treatment is carried out according to known processes to a person skilled in the art e.g. by dissolving the benzalmalonate in the solvent subsequently to be used in the hydrosilylation reaction followed by the addition of the adsorbent material. The mixture is stirred, eventually at elevated temperature before the adsorbing material is filtered off by conventional methods such as filtration or decantation. The resulting solution comprising the benzalmalonate can be used without isolation in subsequent hydrosilylation reaction according to the inventive process. The amount of the benzalmalonate in the resulting solution can be calculated or determined by standard methods known to a person skilled in the art such as by HPLC or IR drying. It has furthermore been found, that the hydroxy carboxylic acid or a cyclic ester thereof can already be added in said pre-treatment step yielding the same results as if added to the hydrosilylation reaction directly.

The amount of a benzalmalonate carrying an unsaturated carbon-carbon bond such as e.g. the benzalmalonate of formula (IIa) and/or (IIb) used in the hydrosilylation is such as to allow the complete conversion of the H-siloxane units of formula (Ia), respectively (IIIc). Thus, an about equal molar amount of a benzalmalonate to the amount of H-siloxane units is used. In particular, a slight excess of benzalmalonate is used in order to ensure complete conversion of the H-siloxane units.

The process according to the invention is advantageously carried out in an organic solvent suitable for hydrosilylation reactions such as e.g. isopropanol, ethylal, 1,3-dioxolane, toluene or xylene. Preferably, isopropanol is used as solvent in the hydrosilylation reaction.

Hydrosilylation are performed using a hydrosilylation catalyst i.e. a transition metal catalyst such as platinum on carbon, chloroplatinic acid, platinum acetyl acetonate, complexes of platinum compounds with unsaturated compounds e.g. olefins and vinyl siloxanes, complexes of rhodium and palladium compounds and complexes of platinum compounds supported on inorganic substrates. It has been found that platinum (0) complex catalysts such as in particular tetravinyl-tetramethyl-tetracyclosiloxane-platinum(0) or 1,3-Divinyl-1,1,3,3-tetramethyl-disiloxane-platinum(0), in particular tetravinyl-tetramethyl-tetracyclosiloxane-platinum (0) are in particular suitable for achieving the result of the invention.

It is preferred to select the hydroxy carboxylic acid or a cyclic ester thereof (one or more compounds) from hydroxy-carboxylic acids such as glycolic acid or lactic acid, hydroxy-dicarbonic acids such as tartaric acid or hydroxytricarbonic acids such as citric acid as well as cyclic esters thereof such as ascorbic acid without being limited thereto. Preferred hydroxy carboxylic acid or a cyclic ester thereof are glycolic acid, ascorbic acid and/or citric acid. Citric acid is the most preferred.

The amount of the hydroxy carboxylic acid or a cyclic ester thereof used in the hydrosilylation reaction is not critical. In particular, an amount of 0.05-5 wt.-% such as an amount of 0.1-1 wt.-% based on the weight of a benzalmalonate carrying an unsaturated carbon-carbon bond such as a benzalmalonate of formula (IIa) and/or (IIb) is used.

The hydrosilylation reaction may be run at an elevated temperature, e.g. in a range of from 40° C. to 150° C., preferably from 40° C. to 80° C., e.g., at about 60° C., wherein the reaction temperature should not exceed the boiling point of the solvent(s) used.

In a further embodiment, the processes of the invention are always carried out in isopropanol as solvent in the presence of a platinum complex catalyst such as in particular tetravinyl-tetramethyl-tetracyclosiloxane-platinum(0) using glycolic acid, ascorbic acid and/or citric acid, in particular citric acid, at a temperature of about 55-65° C.

After the hydrosilylation reaction the organic solvent can either be evaporated directly or a subsequent washing step may be included. Such washing steps are well known to a person in the art. In a particular embodiment, a washing step with a mixture of MeOH/water is included. The ratio of MeOH/water is not critical and may range from 20:1 to 5:1 such as e.g. 10:1.

The reaction of the process according to the invention can in principle be carried out in any reactor suitable for the respective reaction type. Without restricting generality, the following are mentioned by way of example: suspension reactor, stirred tank, stirred tank cascade, tubular reactor, shell-type reactor, shell and tube reactor, fixed-bed reactor, fluidized-bed reactor, reactive distillation column.

The invention is illustrated further by the examples without being limited thereto Preparation of Polysilicone-15

Step 1 Pre-treatment: A solution of 255 g of 2-[[4-(2-propyn-1-yloxy)phenyl]methylene]-propanedioic acid 1,3-diethyl ester in 730 g of isopropanol was treated with 15 g of Tonsil 412 FF for 60 min at 75° C. After cooling to 45° C. the adsorbent was filtered off and washed with 35 g of isopropanol. The content of 2-[[4-(2-propyn-1-yloxy)phenyl]methylene]-propanedioic acid 1,3-diethyl ester in the filtrate was determined by IR drying to be about 25 wt.-%.

Step 2 Hydrosilylation: To 536 g of the above filtrate 0.23 g of tetravinyl-tetramethyl-tetracyclosiloxane-platinum(0) in 2 ml of isopropanol was added. After heating the reaction to 80° C. 430 g H-organosiloxane 74/6 (linear organopolysiloxane consisting of an average number of 74 units of formula (IIId) and an average number of 6 units of formula (IIIc), wherein $R^1$, $R^2$, $R^4$, $R^5$, $R^6$, $R^7$, $R^8$ and $R^9$, B and B' are methyl groups and which exhibits a viscosity of about 100 mPa/20° C. and a hydrogen content of =0.09 wt.-%) was added continuously in 2 hours and the reaction was stirred for about 8 h-12 h at 80° C.

Step 3 Work-up: The reaction was cooled to 60° C. and 250 g of water was added. The mixture was stirred for about 15 min and the aqueous phase was separated. Subsequently, the organic phase was washed twice with a mixture of MeOH/water (10:1) before being subjected to reduced pressure (250-20 mbar at 75° C.) in order to remove any residual solvents yielding about 540 g of polysilicone-15. The color was assessed by measuring the Gardner value (yellowness index) with a suitable software and a UV spectrometer in accordance with DIN EN ISO 4630-1.

The reaction was repeated with the addition of a hydroxy carboxylic acid or a cyclic ester thereof selected from citric acid monohydrate [A], glycolic acid [B] and ascorbic acid [C]. The hydroxy carboxylic acid or a cyclic ester thereof was added in the amount given in table 1 either in the pre-treatment step 1 or in the hydrosilylation step 2. As can be seen from table 1, the addition of a hydroxy carboxylic acid or a cyclic ester thereof leads to less colored products reflected by significantly lower Gardner values compared to the control reaction carried out in the absence of a hydroxy carboxylic acid or a cyclic ester thereof.

TABLE 1

| No. | Additive | Amount | Addition to step | mess point | result | unit |
|---|---|---|---|---|---|---|
| 1 | none | | | Gardner value | 2.9 | |
| | | | | refractive index | 1.440 | $n_D$ [20° C.] |
| | | | | UV Absorption | 173 | E [1, 1] |
| | | | | viscosity | 740 | mPas/20° C. |
| 2 | [A] | 1 g | 1 | Gardner value | 1.8 | |
| | | | | refractive index | 1.441 | $n_D$ [20° C.] |
| | | | | UV Absorption | 178 | E [1, 1] |
| | | | | viscosity | 750 | mPas/20° C. |
| 3 | [A] | 0.55 g | 2 | Gardner value | 1.6 | |
| | | | | refractive index | 1.441 | $n_D$ [20° C.] |
| | | | | UV Absorption | 176 | E [1, 1] |
| | | | | viscosity | 740 | mPas/20° C. |
| 4 | [B] | 1 g | 1 | Gardner value | 1.8 | |
| | | | | refractive index | 1.442 | $n_D$ [20° C.] |
| | | | | UV Absorption | 178 | E [1, 1] |
| | | | | viscosity | 780 | mPas/20° C. |
| 5 | [C] | 1 g | 1 | Gardner value | 1.6 | |
| | | | | refractive index | 1.44 | $n_D$ [20° C.] |
| | | | | UV Absorption | 165 | E [1, 1] |
| | | | | viscosity | 605 | mPas/20° C. |
| 6 | [A] | 2 g | 1 | Gardner value | 1.6 | |
| | | | | refractive index | 1.441 | $n_D$ [20° C.] |
| | | | | UV Absorption | 173 | E [1, 1] |
| | | | | viscosity | 750 | mPas/20° C. |

The invention claimed is:

1. A process for the manufacture of an organopolysiloxane functionalized with a benzalmalonate by hydrosilylation, wherein the hydrosilylation is carried out in the presence of a hydroxy carboxylic acid or a cyclic ester thereof.

2. The process according to claim 1, wherein the hydrosilylation is carried out in an organic solvent selected from toluene, xylene and isopropanol.

3. The process according to claim 1, wherein the hydroxy carboxylic acid or a cyclic ester thereof is selected from glycolic acid, ascorbic acid and/or citric acid.

4. The process according to claim 1, wherein the hydrosilylation is carried out in the presence of a platinum (0) complex catalysts.

5. The process according to claim 4, wherein the platinum (0) complex catalysts is tetravinyl-tetramethyl-tetracyclosiloxane-platinum(0).

6. The process according to claim 1 comprising the steps of reacting together (a) an organopolysiloxane comprising at least on unit of formula (Ia)

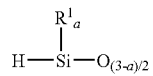

(Ia)

wherein a is 0, 1 or 2, $R^1$ is a saturated or unsaturated $C_1$-$C_{30}$ hydrocarbon group or a trimethylsilyloxy group and, optionally, one or several units of formula (Ib)

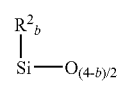

(Ib)

wherein b is 0, 1, 2, 3

$R^2$ is a saturated or unsaturated $C_1$-$C_{30}$ hydrocarbon group or a trimethylsilyloxy group and (b) a benzalmalonate of formula (IIa) and/or (IIb)

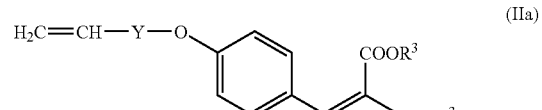

(IIa)

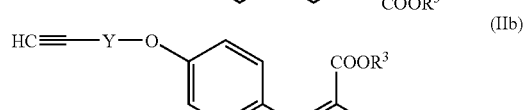

(IIb)

wherein $R^3$ is $C_{1-8}$-alkyl group, and

Y is a divalent $C_1$-$C_{10}$ alkylene or $C_2$-$C_{10}$ alkenylene chain.

7. The process according to claim 6, wherein the organopolysiloxane is a linear organopolysiloxane consisting of one end blocking unit of formula (IIIa) and one end blocking unit of formula (IIIb)

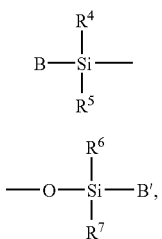
(IIIa)
(IIIb)

s units of formula (IIIc)

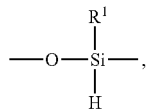
(IIIc)

and r units of formula (IIId)

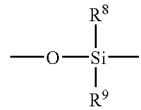
(IIId)

wherein $R^1$, $R^4$, $R^5$, $R^6$, $R^7$, $R^8$ and $R^9$ independently are as defined above for $R^1$;

B and B' independently are a group H or a group $R^1$;

s is an integer from 0 to 50, r is an integer from 0 to 200; and with the proviso that at least B or B' is H when s is 0.

8. The process according to claim 7, wherein $R^1$, $R^2$, $R^4$, $R^5$, $R^6$, $R^7$, $R^8$ and $R^9$ are all methyl, $R^3$ is ethyl and Y is methylene.

9. The process according to claim 6, wherein a benzalmalonate of formula (IIb) is used.

10. The process according to claim 7, wherein s is an integer from 4 to 7 and r is an integer from 50 to 80.

11. The process according to claim 6, wherein the benzalmalonate of formula (IIa) and/or (IIb) is used in about equimolar amounts in relation to the H-siloxane units of formula (Ia), respectively (IIIc).

12. The process according to claim 6, wherein the benzalmalonate of formula (IIa) and/or (IIb) is pre-treated with an adsorbent in the solvent used in the subsequent hydrosilylation.

13. The process according to claim 1, wherein the amount of the hydroxy carboxylic acid or a cyclic ester thereof is selected in the range of 0.1-1 wt.-% based on the weight of a the benzalmalonate of formula (IIa) and/or (IIb).

14. The process according to claim 1, wherein the reaction temperature is in the range of 40° C. to 80° C., and wherein the reaction temperature should not exceed the boiling point of the solvent(s) used.

15. The process according to claim 6, wherein $R^3$ is a $C_{1-4}$-alkyl group.

16. The process according to claim 15, wherein $R^3$ is an ethyl group.

17. The process according to claim 6, wherein Y is a $C_1$-$C_4$ alkylene chain.

18. The process according to claim 17, wherein Y is a methylene chain.

* * * * *